(12) United States Patent
Peterson et al.

(10) Patent No.: US 7,611,080 B2
(45) Date of Patent: Nov. 3, 2009

(54) FULL CONE AIR ASSISTED SPRAY NOZZLE FOR CONTINUOUS METAL CASTING COOLING

(75) Inventors: Lesli Peterson, Glendale Heights, IL (US); Christy Hofherr, Rockford, IL (US)

(73) Assignee: Spraying Systems Co., Wheaton, IL (US)

( * ) Notice: Subject to any disclaimer, the term of this patent is extended or adjusted under 35 U.S.C. 154(b) by 0 days.

(21) Appl. No.: 11/809,824

(22) Filed: Jun. 1, 2007

(65) Prior Publication Data

US 2007/0290073 A1    Dec. 20, 2007

Related U.S. Application Data

(60) Provisional application No. 60/811,059, filed on Jun. 5, 2006.

(51) Int. Cl.
*B05B 1/34* (2006.01)

(52) U.S. Cl. ......... 239/472; 239/494; 239/497; 239/463

(58) Field of Classification Search ......... 239/399, 239/403, 488, 463, 467, 472, 494, 497
See application file for complete search history.

(56) References Cited

U.S. PATENT DOCUMENTS

| | | | |
|---|---|---|---|
| 1,867,878 A | 7/1932 | Covello | |
| 2,352,130 A | 6/1944 | Short et al. | |
| 3,692,245 A * | 9/1972 | Needham et al. | 239/488 |
| 3,716,190 A | 2/1973 | Lindlof | |
| 3,726,482 A * | 4/1973 | Heinrichs | 239/467 |
| 3,895,759 A | 7/1975 | Depalma | |
| 4,406,407 A * | 9/1983 | Aprea et al. | 239/487 |
| 4,474,331 A * | 10/1984 | Aprea et al. | 239/488 |
| 4,511,087 A | 4/1985 | Matsumoto | |
| 4,591,099 A | 5/1986 | Emory et al. | |
| 4,624,414 A | 11/1986 | Ferrazza | |
| 4,796,811 A * | 1/1989 | Davisson | 239/222.17 |
| 4,815,665 A | 3/1989 | Haruch | |
| 4,989,788 A | 2/1991 | Bendig et al. | |
| 6,036,116 A | 3/2000 | Bui | |
| 6,076,744 A | 6/2000 | O'Brien | |
| 6,394,366 B1 | 5/2002 | Adams | |
| 6,561,440 B1 * | 5/2003 | Hofherr | 239/472 |
| 6,705,538 B2 | 3/2004 | Fecht et al. | |
| 2002/0134862 A1 | 9/2002 | Fecht et al. | |

\* cited by examiner

*Primary Examiner*—Dinh Q Nguyen
(74) *Attorney, Agent, or Firm*—Leydig, Voit & Mayer, Ltd.

(57) ABSTRACT

A full cone liquid spray nozzle is provided. The spray nozzle includes a nozzle body having a discharge orifice at a downstream end and an inlet at an upstream end for connection to a liquid supply. A liquid flow passageway extends through the nozzle body communicating between the inlet and the discharge orifice. A vane is disposed in the liquid flow passageway upstream of the discharge orifice. The vane has a plurality of V-shaped passageways therein. Each V-shaped passageway extends inward at an angle with respect to a longitudinal axis of the vane between an upstream face and downstream face of the vane. A whirl and mixing chamber defined by the liquid flow passageway is arranged between the vane and the discharge orifice.

18 Claims, 3 Drawing Sheets

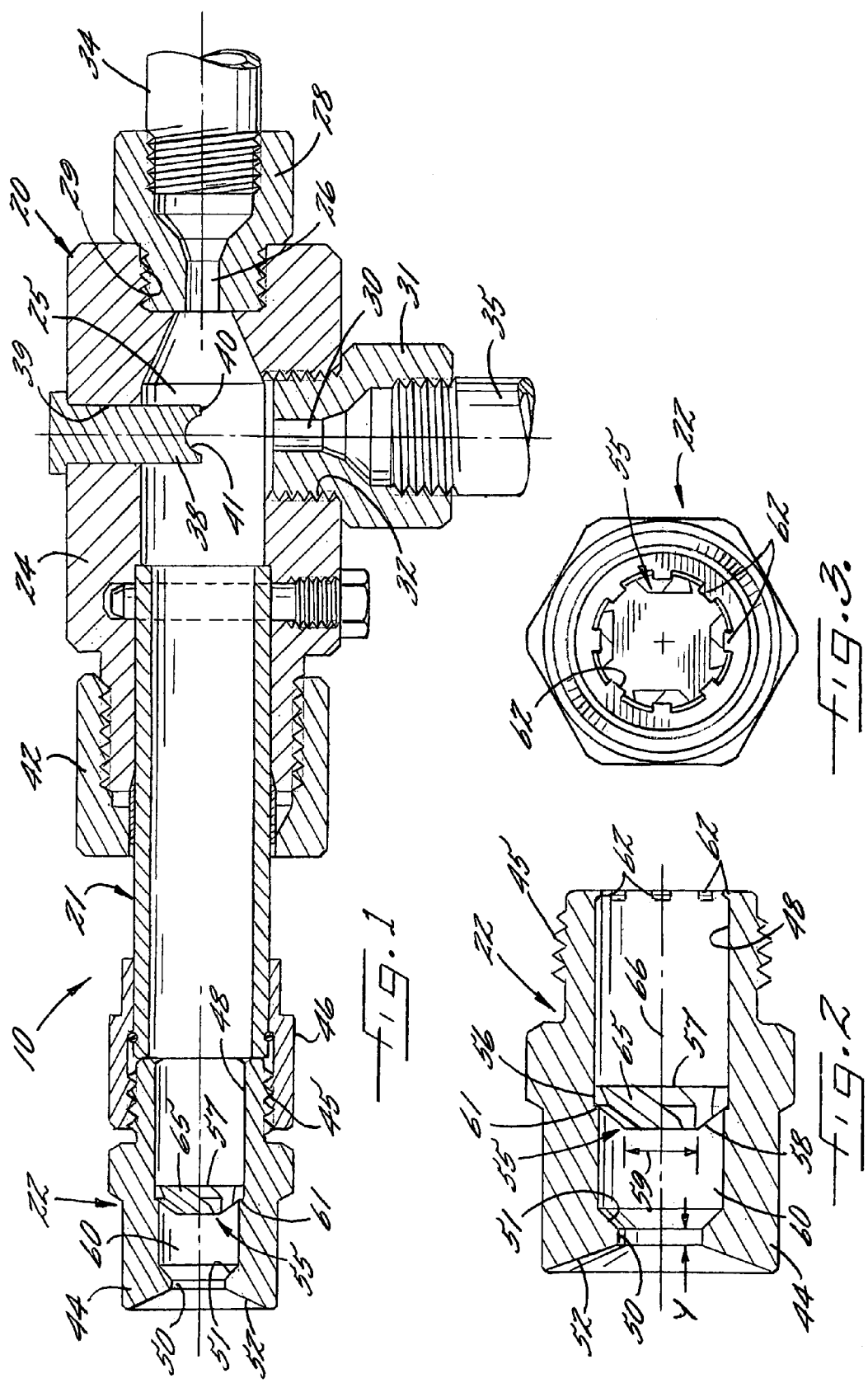

FULL CONE AIR ASSISTED SPRAY NOZZLE FOR CONTINUOUS METAL CASTING COOLING

CROSS-REFERENCE TO RELATED APPLICATIONS

This patent application claims the benefit of U.S. Provisional Patent Application No. 60/811,059, filed Jun. 5, 2006, which is incorporated by reference.

FIELD OF THE INVENTION

The present invention relates generally to pressurized air assisted spray nozzle assemblies, and more particularly, to an air assisted spray nozzle assembly adapted for spraying cooling liquid in continuous metal casting systems.

BACKGROUND OF THE INVENTION

Pressurized air assisted spray nozzle assemblies are known for spraying cooling liquids in continuous metal casting systems, such as disclosed in U.S. Pat. No. 6,726,127 assigned to the same assignee as the present application. Such spraying systems typically preatomize liquid and direct the liquid particles into a flat spray pattern. A plurality of such spray nozzles are aligned along the path of the movement of the continuous cast slab.

In the continuous casting of billets, which are substantially square in cross section, it can be desirable to direct a round spray pattern for more complete and effective coverage. Heretofore, however, it has been difficult to reliably generate a full cone preatomized liquid spray discharge with a uniform liquid particle distribution. Such spray nozzles commonly require a whirl imparting vane which is relatively small in size, can be difficult and expensive to manufacture, and can be subject to clogging.

OBJECTS AND SUMMARY OF THE INVENTION

It is an object of the present invention to provide an air assisted spray nozzle assembly adapted for more reliably directing a full cone liquid spray pattern for use in continuous metal casting cooling systems.

Another object is to provide an air assisted spray nozzle assembly as characterized above which is affective for producing a full cone liquid spray pattern with substantially uniform liquid particle distribution for efficient and complete cooling of the billet castings.

A further object is to provide an air assisted spray nozzle assembly of the above kind which includes a whirl directing vane adapted for enhanced liquid particle distribution and mixing and which includes relatively large size passageways that are less susceptible to clogging.

Another object it to provide such an air assisted spray nozzle assembly that can be manufactured precisely and economically.

Other objects and advantages of the invention will become apparent upon reading the following detailed description and upon reference to the drawings, in which:

BRIEF DESCRIPTION OF THE DRAWINGS

FIG. 1 is a vertical section of an illustrative spray nozzle assembly in accordance with the invention;

FIG. 2 is an enlarged longitudinal section of the spray nozzle of the illustrated spray nozzle assembly;

FIG. 3 is an upstream end view of the spray nozzle shown in FIG. 2;

Figure 4:
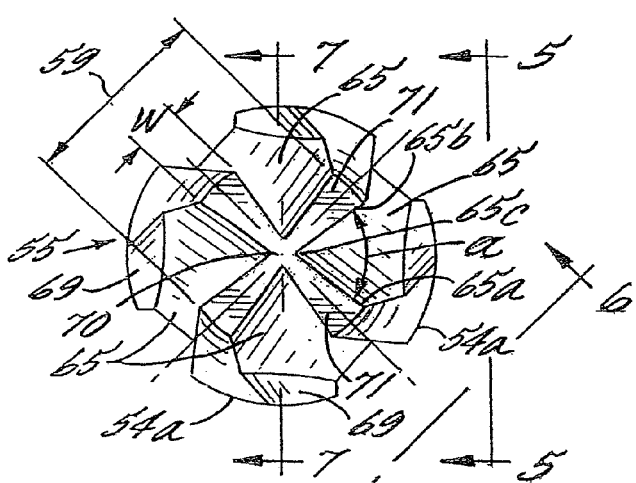
FIG. 4 is a plan view of a downstream end of a whirl imparting vane of the spray nozzle shown in FIG. 2.
Figure 5:
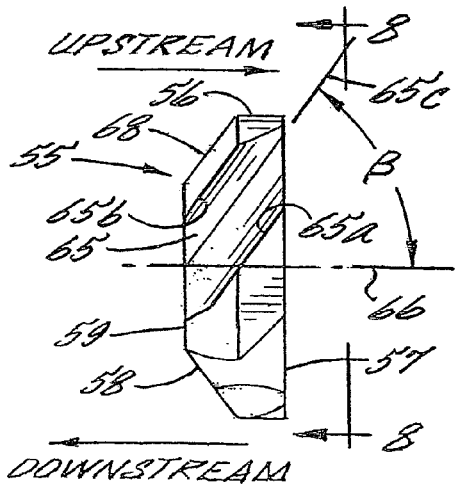
FIGS. 5 and 6 are side views of the illustrative whirl imparting vane, taken in the planes of lines 5-5 and 6-6 in FIG. 4, respectively.
Figure 6:
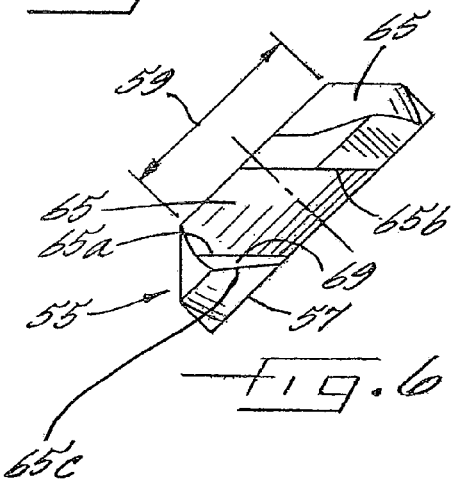
Figure 7:
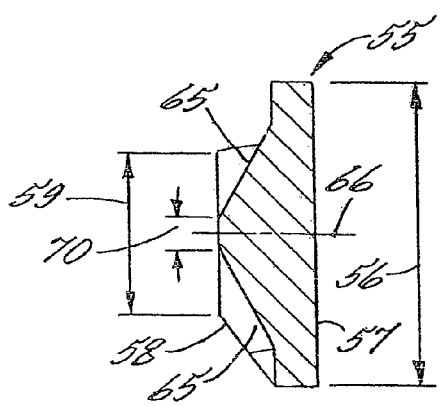
FIG. 7 is a vertical section of the illustrative whirl imparting vane, taken in the plane of line 7-7 in FIG. 4.
Figure 8:
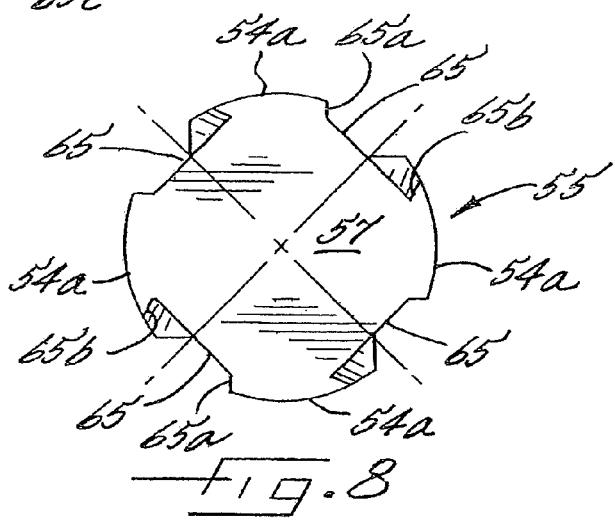
FIG. 8 is a plan view of an upstream end of the illustrated whirl imparting vane.
Figure 9:
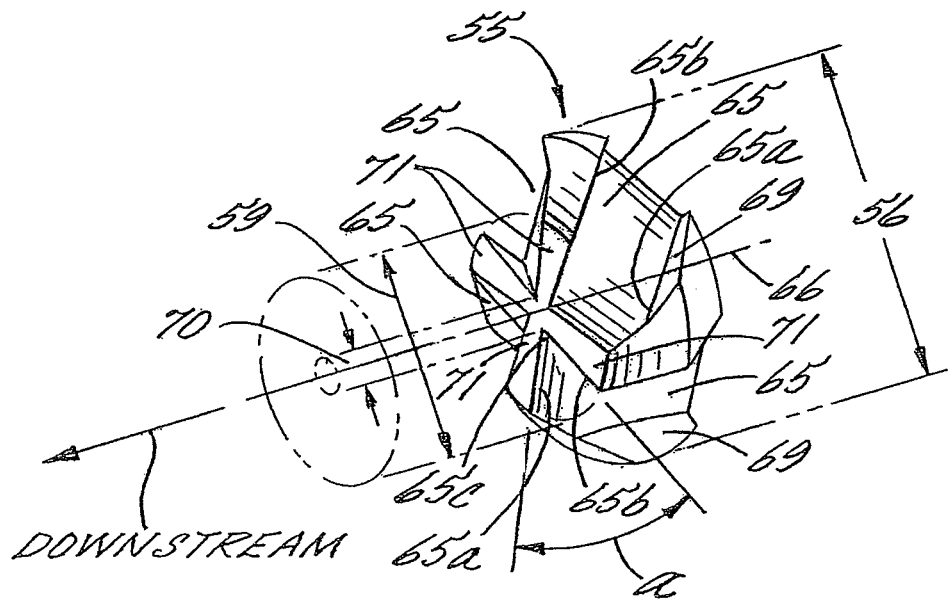
FIGS. 9 and 10 are perspectives of the illustrative whirl imparting vane taken in substantially perpendicular relation to one of the angled V-shaped liquid passages in the vane.
Figure 10:
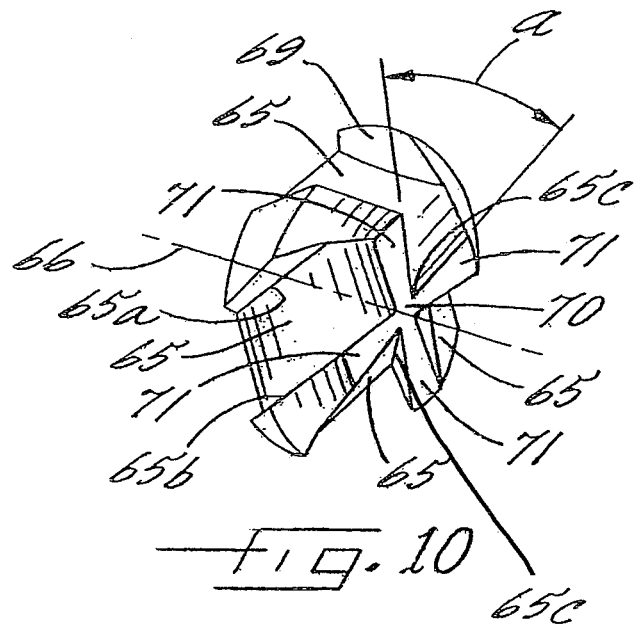

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF PREFERRED EMBODIMENT

Referring now more particularly to FIG. 1 of the drawings, there is shown an illustrated air assisted liquid spray nozzle assembly 10 in accordance with the invention. It will be understood that a plurality of such spray nozzle assemblies may be utilized in a cooling system for a continuous metal casting apparatus, such as shown in the afore-mentioned U.S. Pat. No. 6,726,127, the disclosure of which is incorporated herein by reference.

The illustrated spray nozzle assembly 10 basically comprises a preliminary liquid atomizing head or section 20, an elongated tubular barrel 21 connected at its upstream end to the atomizing head 20, and a spray nozzle 22 connected to the downstream end of the barrel 21. The atomizing head 20 comprises a hollow body 24 having an elongated expansion chamber 25 extending axially thereof, a pressurized air inlet 26 defined by an orifice fitting 28 in threaded engagement in an axial bore 29 in an upstream end of the body 24, and a liquid coolant inlet 30 communicating transversely with the expansion chamber defined by an orifice fitting 31 in threaded engagement with a radial bore 32 extending through a side wall of the body 24. The air inlet orifice fitting 28 is connected to a pressurized air supply line 34, and the liquid inlet orifice fitting 31 is coupled to a liquid coolant, preferably water, supply line 35. The atomizing head 20 further includes an impingement post 38 fixed, such as by a press fit, into a radial bore 39 in diametrically opposed relation to the liquid inlet 30. The impingement post 38 extends into the chamber 25 with an outer end 40 approximately on longitudinal axis of the body 24 formed with a central recess 41. Pressurized air and liquid air streams introduced through the liquid and air inlets 26, 30, respectively, converge in the atomizing head with the assistance of the impingement pin post 38, pre-atomizing the liquid for direction through the barrel 21 and discharge from the spray nozzle 22. The barrel 21 in this case is removably secured to the hollow body 24 by a threaded annular retainer cap 42, consistent with the disclosure of the afore-referenced U.S. Pat. No. 6,726,127.

The spray nozzle 22 comprises an elongated hollow body 44 having an externally threaded upstream end 45 for connection to the end of the barrel 21 by a threaded annular retaining member 46 supported on downstream end of the barrel 21 for rotational and axial movement. Threaded engagement of the retainer member 46 with the spray nozzle end 45, through rotation of the retainer 46, draws the upstream end of the spray nozzle 22 into fixed engagement with the downstream end of the barrel 21.

The nozzle body 44 has an axial liquid passageway 48 communicating with the barrel 21 and a circular discharge orifice 50 at a downstream end of the nozzle body. The discharge orifice 50 in this case is cylindrically configured with an inwardly converging frustoconical inlet section 51 and a relatively small outwardly flared frustoconical section 52 at the exit end.

For imparting a swirling movement to liquid passing through the nozzle body 44 and for further breaking up the liquid particles for distribution throughout a full cone liquid spray pattern emitted from the discharge orifice 50, a vane 55 is provided in the passageway 48 intermediate the upstream end of the nozzle body and the discharge orifice 50. The vane 55 in this case is a separate member or insert press fit within the liquid passageway 48. As will become apparent below, the vane 55 may be formed from a blank slug having a cylindrical upstream section 56 which defines a relatively large diameter upstream end face 57 and an inwardly tapered, frustoconical section 58 which defines a relatively smaller diameter downstream end face 59. For ensuring predetermined longitudinal positioning of the vane 55 upstream of the discharge orifice 50, such that the passageway 48 defines a substantially cylindrical whirl and mixing chamber 60 between the vane 55 and discharge orifice 50, the passageway 48 is formed with a small counter bore that defines a locating seat 61 against which the vane 55 is positioned. To prevent accidental displacement of the vane 55 from the nozzle body 44 in the event it might become loosened, the nozzle body 44 is formed with inwardly directed radial stakes 62 about the upstream end of the inlet passage 48.

In accordance with the present invention, the nozzle vane has a unique passageway construction which facilitates further breakdown of the preatomized liquid and the substantially uniform distribution of liquid particles throughout a discharging full cone spray pattern for enhanced uniform application, such as in cooling of moving metal shapes in continuous metal casting operations. To this end, the whirl imparting vane 55 is formed with a plurality of liquid passageways 65 that proceed at an angle to a longitudinal axis 66 of the vane and are defined by V-shaped cuts. The passageways 65, which have side walls 65*a*, 65*b* at an acute angle to each other, extend through both the upstream relatively large diameter end face 57 of the vane and the relatively smaller downstream end face 59. The sidewall 65*a*, 65*b* of each V-shaped cut define an apex 65 that extends in a straight line through the vane, as depicted in FIGS. 4, 5, and 10. According to one preferred embodiment, a vane with particularly good performance can be produced from a slug having a cylindrical section 56 with a diameter that is 7 times its axial length and a downstream frustoconical section 58 having a downstream end face diameter 59 of 4 times its axial length. Moreover, in that preferred embodiment, the vane can be positioned in the nozzle 22 such that the end face is at a distance l from the discharge orifice 50 that is about 7 times the length y of the orifice and the discharge orifice 50 has a diameter 5.5 times its orifice length y.

The apex 65*c* of each V-shaped passageway 65 is at an angle β to the longitudinal axis of the vane and extends through the downstream end face 59 short of the axial center 66 of the vane. In the illustrated embodiment, the vane 55 has four V-shaped passageways 65 spaced evenly about the circumference of the vane. Each V-shaped passageway 65 has an apex 65*c* that forms an angle β of about 55° to the longitudinal axis of the vane. Moreover, the sides 65*a*, 65*b* of the V-shaped passageways 65 preferably define an acute angle α of between approximately 40° and approximately 50°, and most preferably an angle of about 46°. In this case, the upstream end face 57 of the vane 55 has a generally rectangular appearance defined by sides 65*a*, 65*b* of the V-shaped cuts and four generally circumferential spaced seating segments 54*a* of the upstream cylindrical section 56 of the vane 55, which can be press fit within the nozzle body for secure retainment. The cuts which define the V-shaped passageways 65 in this instance further define a small ledge 69 in the upstream cylindrical section 56 of the vane opposite the apex 65*c* of the passageway.

In keeping with the invention, the cuts which define the V-shaped passageways 65 extend nearly to a center of the downstream end face 59 of the vane. More particularly, the apexes 65*c* of the V-shaped passageways 65 intersect the downstream end face 59 so as to define a relatively small circular end face surface 70 defined by a circle through the apexes 65*c* of the passageways 65. The apexes 65*c* preferably extend to within about 0.015 inches of the vane axis so as to define a circular end face surface 70 having a diameter no greater than about ⅛$^{th}$ the diameter of the downstream end face 59 of the frustoconical end section of the vane 55. The four V-shaped passageways 65 in this case define a relatively small cross-shaped end surface pattern defined by the circular central end surface 70 and four relatively small surface area legs 71 that extend in slightly outwardly extending relation from the central end face surface 70, as viewed from a downstream end of the vane (FIG. 4). The vane 55 accordingly has a general cross leaf appearance. The V-shaped passageways preferably have a depth such that the largest width w of the cross pattern is ¼ the diameter 59 of the end face.

In operation of the spray nozzle assemble 10, it will be seen that liquid and pressurized air streams directed into the preatomizing head of 20 will be preatomize the liquid with the assistance of the liquid stream impinging upon the recessed end face of the impingement post 38. The preatomized liquid particles are forcefully directed through the barrel 21 to the spray nozzle 22. As the preatomized liquid particles pass through the plurality of angled passageways 65 in the vane 55, the particles are broken down further and directed into the downstream mixing chamber 60 in swirling fashion. This causes the liquid to further break down and intermix for subsequent discharge though the discharge orifice 50 in a full cone liquid spray pattern with substantially uniformly atomized liquid distributed throughout the full cone spray pattern. The illustrated spray nozzle is effective for maintaining a relatively constant spray angle over a large pressure range, such as between 10 psi and 100 psi, with the V-shaped passageways of the vane and the large open tip area preventing clogging.

From the foregoing, it can be seen that an air assisted spray nozzle assembly is provided that is adapted for reliably directing a full cone spray pattern with uniform particle distribution, particularly effective for application in continuous metal casting systems. The spray nozzle assembly includes a whirl directing vane adapted for enhanced liquid particle distribution and mixing with relatively large size passageways that are less susceptible to clogging. The vane further lends itself to precision, yet economical, manufacture.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A full cone liquid spray nozzle comprising:
   a nozzle body having a discharge orifice at a downstream end and an inlet at an upstream end for connection to a liquid supply, a liquid flow passageway extending through the nozzle body communicating between the inlet and the discharge orifice;
   a vane having an outer perimeter disposed in fixed engaging relation with the nozzle body liquid flow passageway upstream of the discharge orifice, said vane having circular upstream and downstream end faces, said vane having a plurality of V-shaped passageways therein each extending through the outer perimeter of the vane between and through said upstream face and downstream face of the vane;
   a whirl and mixing chamber defined by the liquid flow passageway between the vane and the discharge orifice;
   said V-shaped passageways each having a pair of opposed sidewalls at an acute angle to each other that define a straight line apex at an angle to and in a different plane than the longitudinal axis of the vane, said opposed side walls of each V-shaped passageway extending from the straight line apex of the passageway to an outer perimeter of the downstream face of the vane, and
   said vane having an axial length less than the diameter of said downstream face.

2. The spray nozzle of claim 1 wherein the vane includes an upstream cylindrical section and a downstream frustoconical section, and at least said upstream cylindrical section being in fixed engaging relation with said nozzle body liquid flow passageway.

3. The spray nozzle of claim 2 wherein the V-shaped passageways are arranged and configured so as to define a plurality of seating segments in the cylindrical section of the vane which engage an inside wall of the fluid passageway in the nozzle body so as to retain the vane in the fluid passageway.

4. The spray nozzle of claim 2 wherein the plurality of V-shaped passageways are spaced evenly about the circumference of the vane.

5. The spray nozzle of claim 2 wherein the cylindrical section of the vane has a diameter approximately seven times an axial length of the cylindrical section.

6. The spray nozzle of claim 2 wherein the frustoconical section has a diameter at the downstream face of the vane that is approximately four times the axial length of the frustoconical section.

7. The spray nozzle of claim 1 wherein an apex of each of the V-shaped passageways intersects the downstream face of the vane at a position offset from an axial center of the vane.

8. The spray nozzle of claim 7 wherein the intersection of the V-shaped passageways with the downstream face of the vane so as to form a generally circular end face surface that is defined by a circle through the apexes of the V-shaped passageways.

9. The spray nozzle of claim 1 wherein the vane is positioned in the liquid flow passageway such that the downstream face of the vane is at a distance from the discharge orifice that is approximately seven times a length of the discharge orifice.

10. The spray nozzle of claim 9 wherein the discharge orifice has a diameter approximately five and one half times the length of the discharge orifice.

11. The spray nozzle of claim 1 wherein each V-shaped passageway includes a pair of sidewalls at an acute angle to each other.

12. The spray nozzle of claim 11 wherein the sidewalls of each V-shaped passageway of the vane define an angle of between approximately 40° and 50°.

13. The spray nozzle of claim 1 wherein each V-shaped passageway has an apex that defines an angle of approximately 55° with the longitudinal axis of the vane.

14. A full cone liquid spray nozzle comprising:
   a nozzle body having a discharge orifice at a downstream end and an inlet at an upstream end for connection to a liquid supply, a liquid flow passageway extending through the nozzle body communicating between the inlet and the discharge orifice;
   a vane having an outer perimeter disposed in fixed engaging relation with the nozzle body liquid flow passageway upstream of the discharge orifice, said vane having a plurality of V-shaped passageways therein extending through the outer perimeter of the vane between an upstream face and downstream face of the vane;
   a whirl and mixing chamber defined by the liquid flow passageway between the vane and the discharge orifice;
   said V-shaped passageways each having a pair of opposed sidewalls at an acute angle to each other that define a straight line apex at an angle to and in a different plane than the longitudinal axis of the vane, said opposed side walls of each V-shaped passageway extending from the straight line apex of the passageway to an outer perimeter of the downstream face of the vane,
   said V-shaped passageways intersecting the downstream face of the vane at a position offset from an axial center of the vane so as to form a solid generally circular end face surface that is defined by a circle through the apexes of the V-shaped passageways and a plurality of surface area legs that extend outward from the circular end face surface when viewed towards the downstream face of the vane, and said surface area legs having a radial length greater than the radius of said circular end face surface defined by the apexes.

15. The spray nozzle of claim 14 wherein the width of each surface area leg has a largest width that is approximately ¼ the diameter of the downstream face of the vane.

16. The spray nozzle of claim 14 in which said surface area legs have a radial length greater than four times the radius of the circular end face defined by the apexes.

17. A full cone liquid spray nozzle comprising:
a nozzle body having a discharge orifice at a downstream end and an inlet at an upstream end for connection to a liquid supply, a liquid flow passageway extending through the nozzle body communicating between the inlet and the discharge orifice;
a vane having an outer perimeter disposed in fixed engaging relation with the nozzle body liquid flow passageway upstream of the discharge orifice, said vane having circular upstream and downstream faces, said vane having a plurality of V-shaped passageways therein extending through the outer perimeter of the vane between and through an upstream face and downstream face of the vane;
said V-shaped passageways each having a pair of opposed sidewalls at an acute angle to each other that define a straight line apex at an angle to and in a different plane than the longitudinal axis of the vane, said opposed side walls of each V-shaped passageway extending from the straight line apex of the passageway to an outer perimeter of the downstream face of the vane,
a whirl and mixing chamber defined by the liquid flow passageway between the vane and the discharge orifice,
said V-shaped passageways intersecting the downstream face of the vane at a position offset from an axial center of the vane so as to form a solid generally circular end face surface that is defined by a circle through the apexes of the V-shaped passageways having a diameter no greater than ⅛$^{th}$ than the diameter of the downstream face of the vane through which said V-shaped passageways extend.

18. A full cone liquid spray nozzle comprising:
a nozzle body having a discharge orifice at a downstream end and an inlet at an upstream end for connection to a liquid supply, a liquid flow passageway extending through the nozzle body communicating between the inlet and the discharge orifice;
a vane having an outer perimeter disposed in fixed engaging relation in the nozzle body liquid flow passageway upstream of the discharge orifice, said vane having a plurality of V-shaped passageways extending through the outer perimeter thereof between an upstream face and downstream face of the vane;
a whirl and mixing chamber defined by the liquid flow passageway between the vane and the discharge orifice;
said V-shaped passageways each having a pair of opposed sidewalls at an acute angle to each other that define a straight line apex at an angle to and in a different plane than the longitudinal axis of the vane, said opposed side walls of each V-shaped passageway extending from the straight line apex of the passageway to an outer perimeter of the downstream face of the vane,
said vane including an upstream cylindrical section that defines said upstream end face and a downstream frustoconical section that defines said downstream end face, and
said frustoconical section being disposed within a cylindrical section of said liquid passageway with a tapered side of the frustoconical sections extending inwardly in spaced relation from said cylindrical section in a downstream direction.

* * * * *